INVENTORS
Emmett L. Walters,
Curtis W. Davis, Jr. and
Otto V. Young
BY Hobbs & Swope
ATTORNEYS

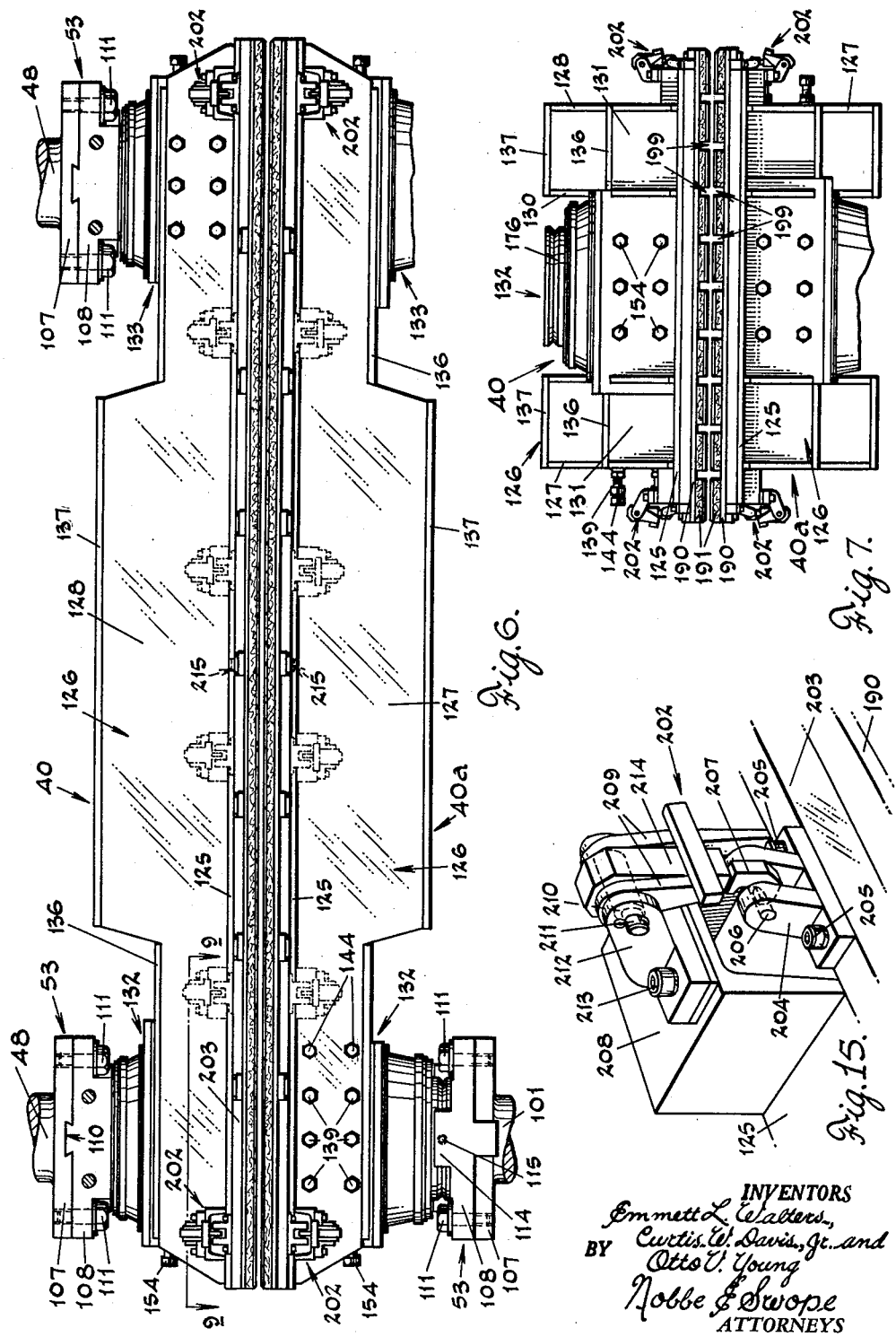

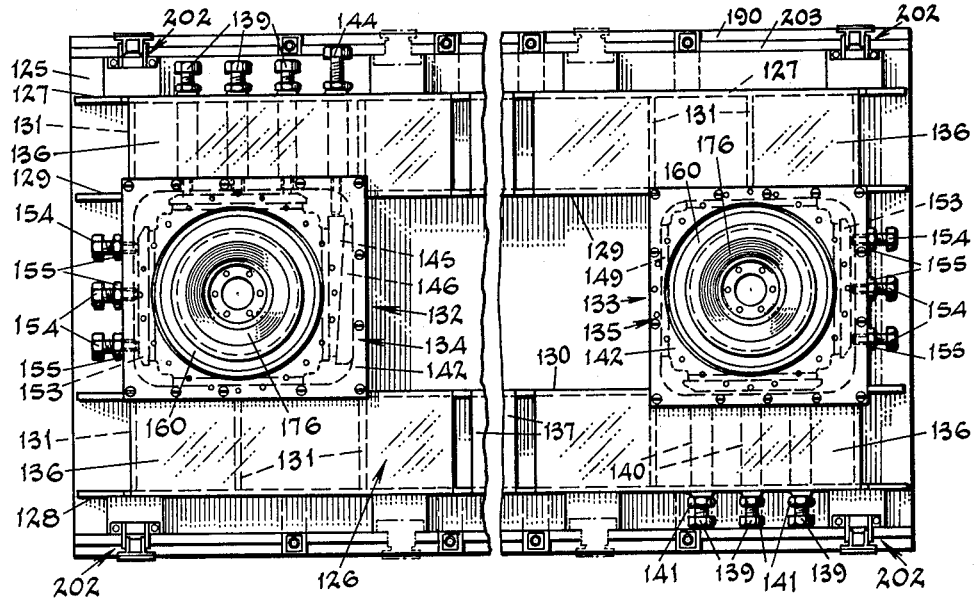
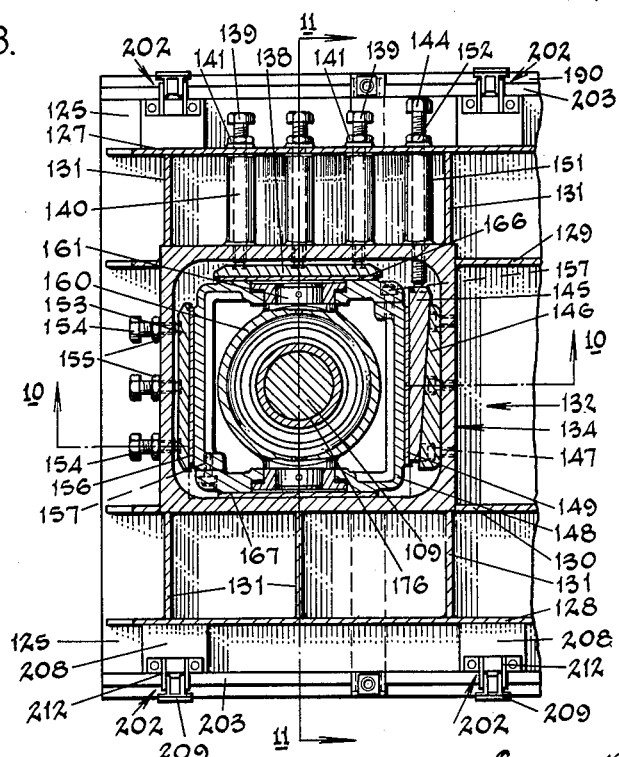

United States Patent Office

3,107,456
Patented Oct. 22, 1963

3,107,456
APPARATUS FOR SURFACING GLASS
Emmett L. Walters, Curtis W. Davis, Jr., and Otto V. Young, Toledo, Ohio, assignors to Libbey-Owens-Ford Glass Company, Toledo, Ohio, a corporation of Ohio
Filed Sept. 14, 1961, Ser. No. 138,168
19 Claims. (Cl. 51—58)

The present invention relates broadly to apparatus for surfacing glass and, more particularly, to an improved apparatus for simultaneously polishing both surfaces of a continuous glass sheet or ribbon moving in a predetermined horizontal path.

It has been previously known from U.S. Patents Nos. 1,962,766 and 1,962,767, issued June 12, 1934, to J. P. Crowley et al., to simultaneously surface, i.e. grind and/or polish, the opposed surfaces of a glass sheet or ribbon moving along a definite path by an oscillating motion of the surfacing unit which includes upper and lower opposed, generally rectangular surfacing runners that extend the width of the sheet or ribbon in a direction transverse to the movement thereof. This oscillating motion, which is obtained through an eccentric or bell-crank type drive mechanism connected to each end of the runner, is best described as a curvilinear translation in which every point on the surface of the runners moves in the same direction and for the same distance as every other point thereon. In this respect, the curvilinear translation may be such that every point describes a circle or an elliptical-type path, whichever is desired.

While the method and apparatus shown and described in the above Crowley et al. patents are satisfactory for certain purposes, the apparatus of the present invention has proven to be of particular utility and supplies important advantages not available in the prior art structures.

For example, it has been found that during the continuous surfacing of glass sheets, the runners or polishing platens tend to become heated due to friction to an extent which frequently causes an expansion thereof to take place. This expansion of the surfacing platens, although of relatively small magnitude, has created problems, particularly in the more advanced, proposed types of long-bar twin polishing apparatus, in maintaining the proper alignment between the driving spindles and the bearing wells or cages on the platens for receiving such spindles. More particularly, the unequal expansion of the platens and the driving spindles therefor, the spindles being disposed at a point more remote from the actual polishing engagement than the platens themselves, may result in a binding of the spindles and the bearing surfaces whereby the proper journaling action therebetween necessary to maintain the curvilinear translation movement is not obtained.

In this same connection, it has been found that extremely close tolerances must initially be adhered to between the center distance of the bearing cages on the platen and the center distance between the driving spindles, which tolerances in turn impose very strict requirements in the assembly and machining operations of the platen. For example, the center distance between the driving spindles in the polishing apparatus is, as a matter of course, a fixed or established distance. Accordingly, in manufacturing platens for use in the surfacing apparatus, extreme care must be exercised in establishing the center distance of the bearing cages located therein. Any slight error in the dimensions of the platen would require reworking thereof, unless of course, means are provided within the bearing cages themselves to initially permit adjustments to be made to compensate for variations in the center distance therebetween and the actual distance between the centers of the driving spindles.

In addition to the above difficulties, it has been found that uneven wear of the platen polishing pad or felt often occurs in surfacing glass by the long-bar type of apparatus which in turn causes non-uniform and therefore detrimental polishing to be effected where no provision is made for compensating for such uneven wear. In this respect, the uneven wear of the pad may result from variations in the density of the felt material itself, from the non-uniform distribution of polishing slurry across the length of the platen, or even from a slight misalignment in the conveying rollers on either side of the surfacing units whereby the glass enters between the opposed polishing runners at a slight angle to the horizontal. In such situations, unless provision is made in the platen bearings themselves for compensating for the uneven wear of the pad, some areas of the glass across the width thereof will have a greater pressure applied thereto than adjacent areas.

As mentioned above, one difficulty which leads to unequal wear of the polishing pad is a non-uniform supply of polishing slurry over the entire area of the pad. In particular, problems have arisen with prior art structures in maintaining a proper slurry distribution at the ends of the platens, or at those portions thereof under the driving spindles and bearing cages.

Finally, a serious problem that has arisen in surfacing apparatus of the long-bar type is the tendency of the platens to rock or rotate slightly about their longitudinal axis, i.e. in the direction of movement of the glass ribbon. Such rotation, which of course to a great extent is induced by the movement of the ribbon itself, has been found to produce an objectionable crown in the polishing felt extending longitudinally of the platen.

Thus, it will be seen that many difficulties are encountered in the surfacing of continuous glass ribbons by the long-bar type of apparatus which, unless proper provision is made for overcoming same, will completely disrupt the surfacing process and thereby offset all of the many advantages such a process possesses over the more conventional types of grinding and polishing methods and apparatus.

It has now been discovered, and the instant invention is based upon such discovery, that all of the above noted difficulties with apparatus of the long-bar type can be eliminated by the provision of a runner or surfacing platen which includes novel adjustable and expansion-absorbing bearing assemblies for receiving the driving spindles, which bearing assemblies include trunnions for mounting the platens thereto, together with a hollow platen plate for supporting the polishing pad or felt.

It is, therefore, a primary object of the present invention to provide an improved surfacing apparatus and, more particularly, a novel polishing runner or platen of the long-bar type which is effective to uniformly polish the surface of a continuous moving glass ribbon.

Another object of the invention is the provision of such surfacing apparatus including a novel platen for insuring a uniform distribution of the polishing slurry or fluid medium to all parts thereof while the platen is pressed into contact with the glass ribbon.

Another object of the invention is the provision of an adjustable and vibration-absorbing bearing assembly for the surfacing platen which is effective to compensate for the expansion and contraction thereof induced by the surfacing operation.

A further object of the invention is to provide a trunnion mounting for the bearing assembly to enable a rocking or tilting of the surfacing platen in a first plane while maintaining it level or rigid in a second plane normal to said first plane.

A still further object of the invention is to provide a pair of opposed, generally rectangular polishing platens which uniquely cooperate to simultaneously polish both surfaces of a continuous glass ribbon moving along a predetermined, substantially horizontal path.

Other objects and advantages of the invention will become more apparent during the course of the following description when taken in connection with the accompanying drawings.

In the drawings wherein like numerals are employed to designate like parts throughout the same:

FIG. 6 is an enlarged front elevation of the polishing platens of the apparatus;

FIG. 7 is an end elevational view of the polishing platens;

FIG. 8 is a broken plan view of the polishing platens;

FIG. 9 is a fragmentary horizontal sectional view taken on line 6—6 of FIG. 6;

FIG. 15 is a perspective view of a clamping device for securing the felt supporting plate to the polishing platen.

Figure 1:
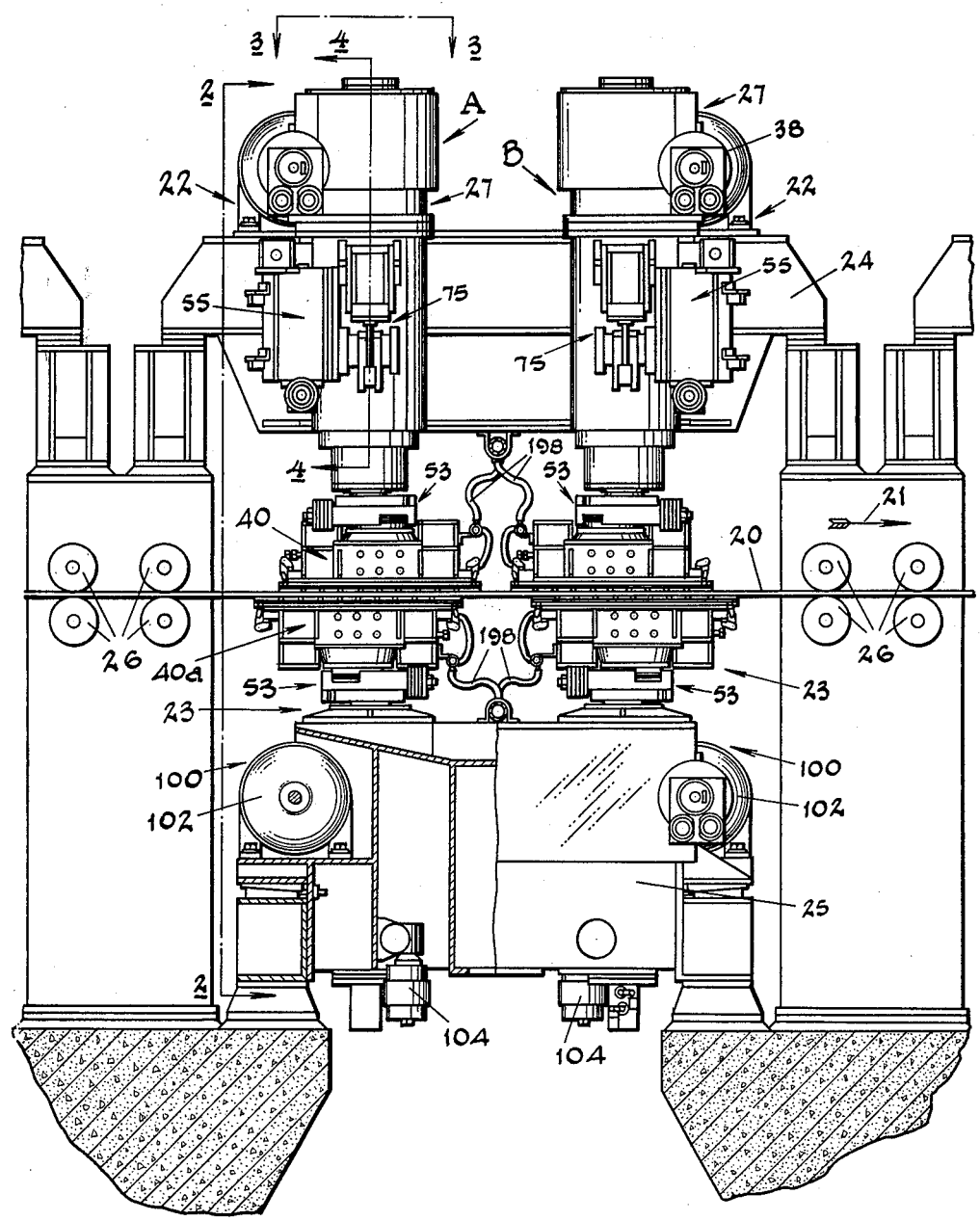
FIG. 1 is a side elevation of a polishing apparatus constructed in accordance with the invention.
Figure 2:
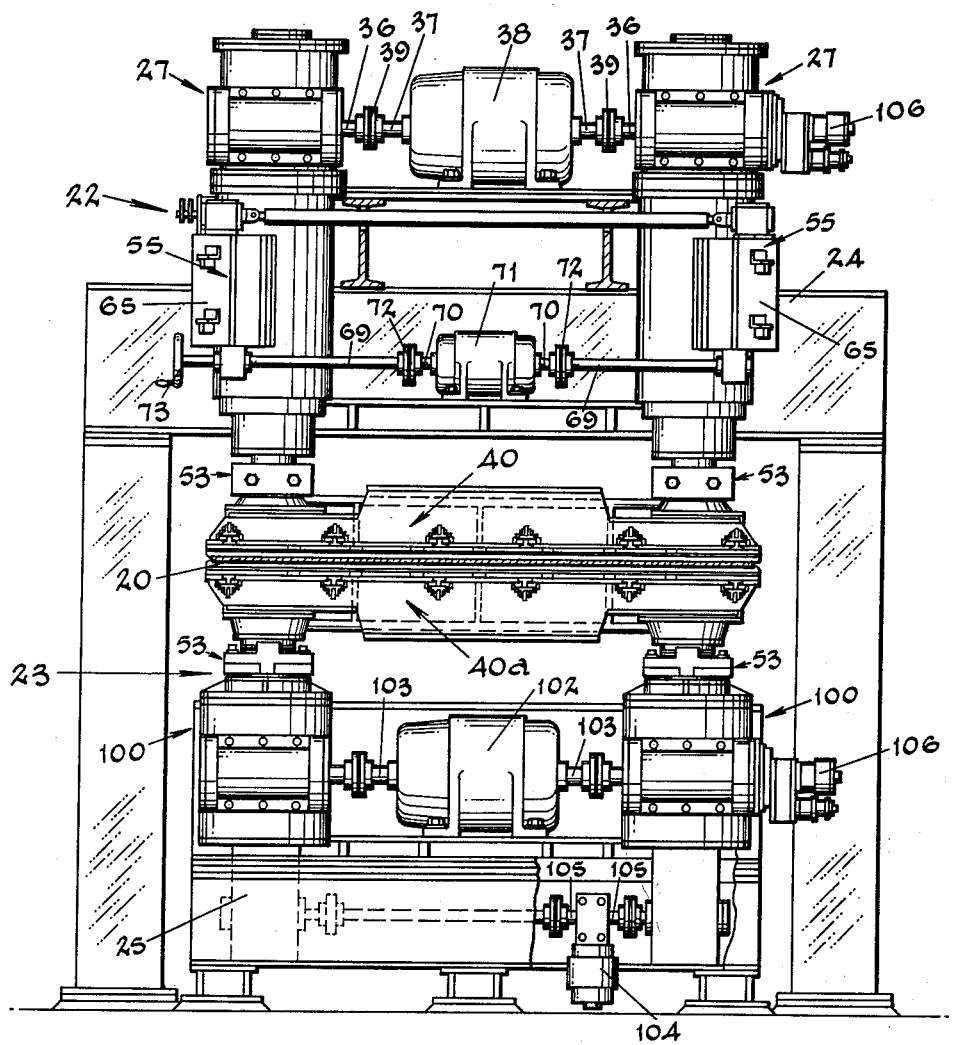
FIG. 2 is a vertical transverse view of the apparatus as taken on line 2—2 of FIG. 1.
Figure 3:
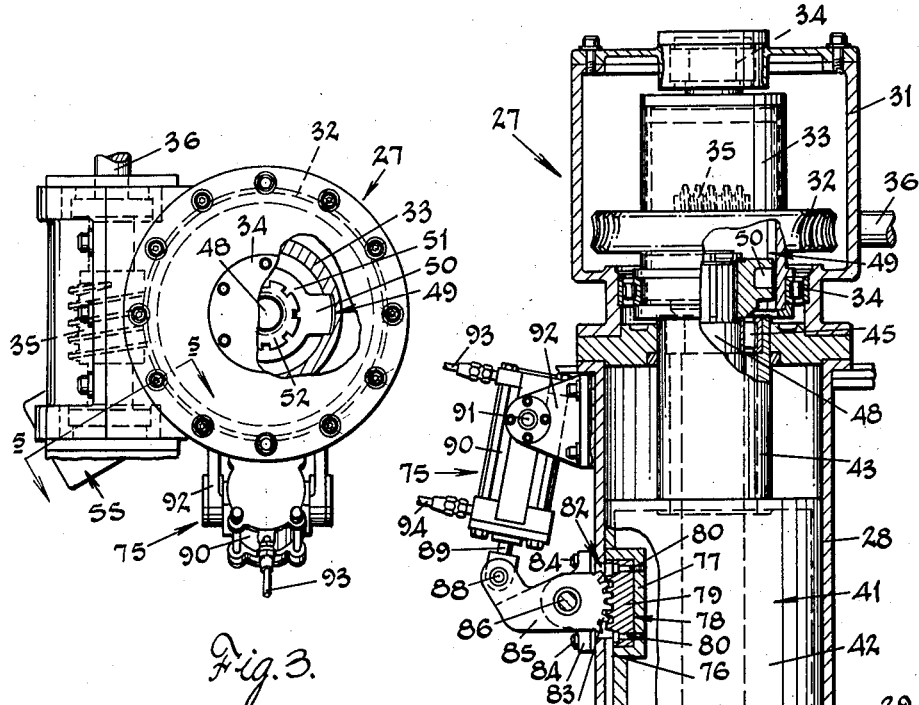
FIG. 3 is a broken plan view of the driving heads looking from the line 3—3 of FIG. 1.

Briefly stated, the apparatus according to the present invention includes a pair of opposed, generally rectangular surfacing platens extending transversely across the path of travel of the glass ribbon on either side thereof. Each platen is driven by a pair of head assemblies which impart a curvilinear translatory motion to the platens through an eccentric mechanism and a pair of driving spindles. The driving spindles are received at opposite ends of the platens in bearing wells or cages, each of which includes a bearing housing located interiorly thereof. The bearing housing in turn includes a pair of trunnions projecting outwardly therefrom on either side of the housing along an axis extending transversely of the platen, with the platen being journaled on such trunnions to rock in a vertical plane normal to the direction of movement of the ribbon and about said axis. Such a rocking action has been found to be effective to compensate for the most part for uneven wear in the polishing pad and therefore enable a smooth and uniform surface to be obtained across the glass ribbon.

The bearing wells are defined by an upstanding plate or frame member which is rigidly secured to the base plate of the platen. A plurality of adjustable clamping members are provided which act between the frame and the bearing housing for rigidly locating such housing relative to the frame whereby a shifting or adjustment of the center distance between the bearing housings on each platen may be effected.

The clamping members together with the fixed portions of the frame defining the bearing wells act through a resilient, vibration dampening material in locating the bearing housing, thereby enabling a predetermined amount of "play" therebetween which is effective to compensate for any expansion of the platen relative to the driving spindles as received in the housings encountered during the surfacing operation.

In addition to the above novel embodiments, the working face of the platens is defined by a hollow chamber between the base plate of the platen and the felt or actual glass contacting surface thereof. Holes or openings are provided in the bottom wall of the hollow chamber which communicate with channels located in a predetermined pattern in the chamber and with grooves in the felt face whereby the polishing slurry may be introduced under pressure into the channels and thence into the slurry distribution grooves and finally into contact with the glass surface. The provision of the hollow chamber has been found to be particularly desirable in that the distribution grooves directly under the driving spindles and bearing wells on the platen body may be readily supplied with sufficient polishing slurry to enable an even and uniform polishing across the entire width of the glass ribbon.

Referring now to the drawings and in particular to FIGS. 1 to 5, there is shown a ribbon of glass 20 being continuously advanced at one of a comparatively wide range of speeds in the direction of the arrow indicated by the numeral 21 through a plurality of polishing stations, two of which are indicated by the letters A and B. Each station is comprised, generally, of apparatus 22 for polishing the upper surface of the glass ribbon and apparatus 23 for polishing the lower surface of the ribbon.

The upper surface polishing apparatus 22 is supported on a framework 24 while the lower surface polishing apparatus 23 is supported on a framework 25. The framework 24 is provided with a plurality of motor-driven pinch rolls 26 transversely contacting the upper and lower surfaces of the glass ribbon 20 between each pair of stations A and B to advance the ribbon in the direction of the arrow 21.

The upper surface polishing apparatus 22 includes a pair of head assemblies 27 suspended in spaced relation inside the opposed edges of the ribbon 20.

Figure 4:
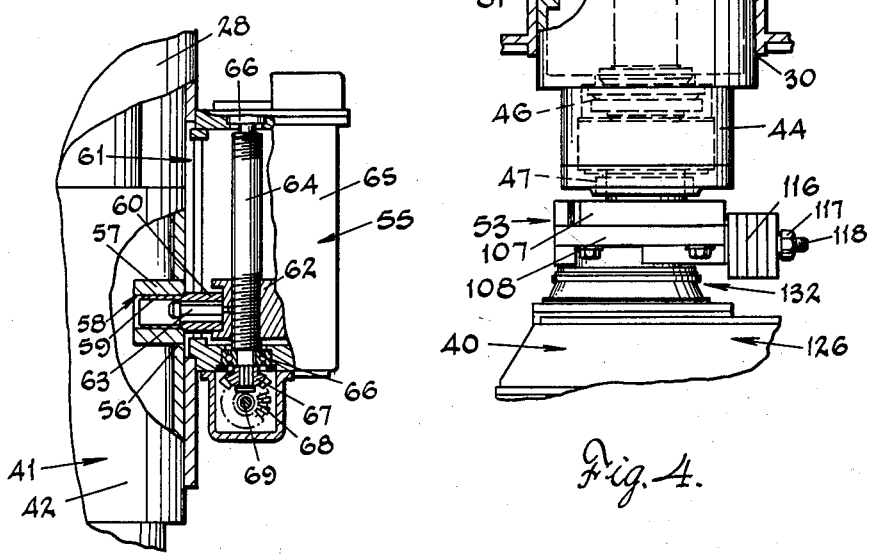
FIG. 4 is an enlarged sectional view taken along the line 4—4 of FIG. 1.
Figure 5:
FIG. 5 is a fragmentary sectional view taken along the line 5—5 of FIG. 3.

As best shown in FIGS. 4 and 5, each head assembly 27 comprises a cylinder 28 having a bore 29 open at its bottom end 30 and closed at its top end by a gear case 31. A worm or ring gear 32 is mounted on a hollow spindle 33 which in turn is supported within the gear case 31 by bearings indicated generally at 34 for rotation about the extended center line of the bore 29. A worm 35 engages the worm or ring gear 32 and is fastened to a shaft 36 which projects outwardly from the gear casing 31 to connect to the drive shaft 37 of a motor 38 through a flexible coupling 39. As is clearly shown in FIG. 2, the drive motor 38 is double-ended and is connected to drive the two upper head assemblies 27 which are connected to a single polishing platen indicated generally at 40 in a manner to be hereinafter described.

Slidably supported within the cylinder 28, for reasons to be more fully hereinafter disclosed, is a sleeve member 41 having a hollow body portion 42, a tubular upwardly directed portion 43 of smaller diameter and a downwardly directed bearing case 44. Generally speaking, the sleeve member 41 is adapted to be moved within the cylinder 28 and relative to the hollow spindle 33. By means of bearings indicated at 45 in the upper sleeve portion 43 and at 46 and 47 in the lower case 44, a shaft 48 is journaled in axial relation within the sleeve member 41 and operatively associated with the worm gear 32 to be driven thereby. For this purpose, the hollow spindle 33 is provided in its inner surface with a groove or keyway 49 (FIG. 3) which receives the projection or key 50 of a coupling 51 secured to the end of shaft 48 by a nut 52. The sleeve member 41 thus supports the shaft 48 through bearings 45, 46 and 47 for rotation therein; said bearings being also adapted to absorb any axial thrust imparted thereagainst when and in the event the sleeve member 41 is moved relative to and within the cylinder 28. At its lower end, the shaft 48 is equipped with an eccentric connection, generally designated by the numeral 53, and which will be hereinafter more fully described in detail.

In this manner then, regardless of the elevation of the eccentric 53, each of the shafts 48 of the two head assemblies 27 is engaged for rotation at identical speeds and direction by the drive motor 38.

As above mentioned, the sleeve 41 is mounted for vertical movement within the cylinder 28, and the shaft 48 carrying the eccentric 53 is rotatably mounted within the sleeve for vertical movement therewith while the projection 50 of the coupling 51 is in driving engagement with the groove 49. As will be appreciated, it is necessary, when initially locating the glass ribbon for the polishing process and additionally in the event of glass breakage, that the platens be elevated or lifted out of their horizontal working plane. In this connection, an elevating mechanism indicated generally at 55 is provided.

As is best seen in FIG. 5, a circular opening 56 penetrates the wall of the sleeve body portion 42 and an open-ended hollow cylinder 57 is piloted or slipped into the opening flush with the outer wall surface of the sleeve portion 42 and projecting into the sleeve in a direction normal to the axis thereof for a distance approximating one-half the radius of the sleeve. The bore 58 of the hollow cylinder 57 provides a snug bearing for the cylindrical end of a lift block 59. At the opposite end of the lift block 59 is an enlarged rectangular section 60 which extends through a vertically extending opening or slot 61 in the side wall of the cylinder 28 thereby enabling vertical movement of the lift block 59 with the sleeve 41. A second lift or actuating block 62 is joined to the lift block 59 by means of a shoulder screw 63 and engages a helically threaded shaft 64. The lift block 62 is held against rotation by inserts (not shown) secured to the inside of a housing 65 which is attached by screws to the outer surface of the cylinder 28 in alignment with the lift block 59.

The threaded shaft 64 is mounted for rotation in bearings 66 provided in the top and bottom of the housing 65 and the lower end of the shaft is extended at a reduced diameter to carry a bevel gear 67 which is in meshed engagement with another bevel gear 68. The gear 68 is in turn fastened to a shaft 69 which is joined to one of the output shafts 70 of a double-ended motor 71 by suitable couplings 72 (see FIG. 2). A crank 73 is also provided at one end of the shaft 69 for manually raising and lowering the eccentrics 53.

Thus, rotation of the output shafts 70 of the motor 71 in either direction imparts a rotary motion to the shaft 64 which in turn moves the lift block 62 in a vertical direction carrying the sleeve 41 and shaft 48 with it. The motor 71 is geared such that rotation of the shafts 70 in one direction lowers the shaft 48 at a slow rate to a predetermined height above the plane of the glass ribbon 20. Further descent is accomplished by rotating the crank 73. Rotation of the motor 71 in the opposite direction raises the shaft 48 from its lowermost position to its uppermost position.

In addition to the mechanism 55, above described, for elevating the pair of drive shafts 48 for each polishing platen, an apparatus or mechanism indicated generally at 75 is provided for establishing and regulating the polishing pressure of the upper platens on the glass ribbon surface. The mechanism 75 is pneumatic and is designed to independently support the weight of the upper surface polishing apparatus 22 and to provide and maintain a desired polishing pressure upon the surface of the ribbon 20.

In this respect, as is best shown in FIG. 4, a vertically extending slot 76 penetrates the side wall of the sleeve 41 and receives an insert or case 77 which is provided with a seat 78 for a rack gear 79. The teeth of the rack gear extend horizontally, flush with or slightly inside the outside diameter of the sleeve 41. Screws 80 retain the rack gear 79 in the seat 78. Another recess or groove 81 is provided in the outer face of the insert 77 and extends downwardly from the bottom of the rack gear 79 for a distance slightly greater than the desired, predetermined vertical travel of the sleeve 41.

A rectangular opening 82 extends through the wall of the cylinder 28 at a point in alignment with the rack gear 79 when the sleeve 41 is at or near its lowermost position. A pair of brackets 83 are attached by screws 84 to the outer surface of the cylinder 28, one on either side of the opening 82 to support a gear segment 85 on a pivot shaft 86 with the teeth 87 of the segment pivotable into and out of engagement with the teeth of the rack gear 79. The end of the gear segment 85 opposite the teeth 87 is pivotally fastened by a pin 88 to a piston rod 89 of a double-acting pneumatic cylinder 90. The cylinder 90 is in turn pivoted on trunnions 91 projecting from the pneumatic cylinder 90 adjacent the top thereof and fastened to the outer surface of the cylinder 28 by means of a bifurcated bracket 92 positioned vertically above the gear segment 85.

A flexible hose 93 admits air from a manually controlled source (not shown) to the top of the cylinder 90 and a second flexible hose 94 from a second manually controlled source (not shown) admits air to the bottom of the cylinder. In this manner then, a predetermined pressure is applied and maintained through the manually activated pneumatic balancing apparatus to balance the weight of the upper platen and the unsupported portion of the eccentric mechanism 53 and then secure the desired polishing pressure of the platens against the upper surface of the glass ribbon.

The driving mechanism for the lower surface polishing apparatus 23 is, for the purpose of the present invention, substantially identical to that of the upper surface polishing apparatus, the only changes being those normally employed to compensate for the respective forces applied thereto. In this respect, the apparatus 23 includes a pair of head assemblies 100 suspended inside the opposed edges of the ribbon 20, and shafts 101 (FIG. 6) driven through a double-ended motor 102 and shafts 103 by similar gearing components as those described in connection with the upper apparatus 22. Additionally, in a somewhat similar manner to the upper apparatus 22, the shafts 101 are mounted through suitable gearing for raising and lowering the lower platens, indicated generally at 40a, into and out of engagement with the glass ribbon. In this connection, the driving means for the raising and lowering of the shafts 101 and the platens 40a is provided by the reversible double-ended motor 104 through shafts 105.

A selsyn system for each of the head assemblies, generally indicated at 106, is provided to synchronize the curvilinear translation motions of the upper and lower platens comprising a station, preferably at 180° out-of-phase relation.

It should be noted that since the detailed structure of the drive, elevating, and polishing pressure imposing mechanism form only an ancillary portion of this invention, only that structure deemed essential for an understanding of the basic features of the various motions imposed to the surfacing platens has been shown and described.

Figure 11:
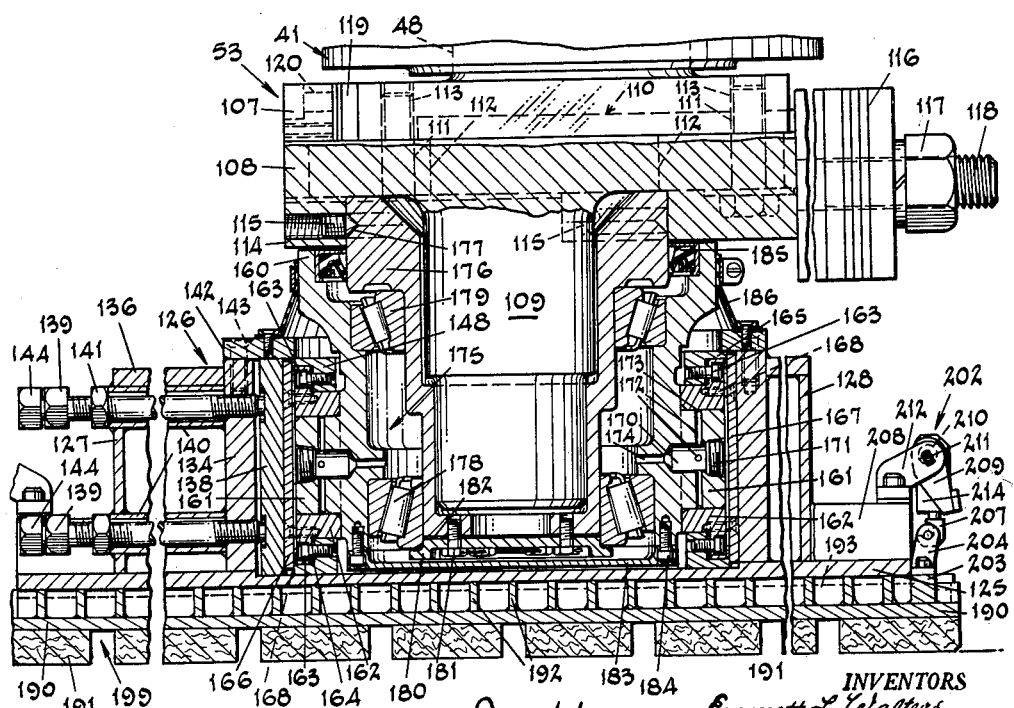
FIG. 11 is a vertical sectional view taken on line 11—11 of FIG. 9.

Each of the drive shafts 48 and 101 is provided at its lower and upper ends respectively with eccentric drive mechanisms, indicated generally at 53, which are mounted in inverted positions. These eccentric drive mechanisms include two rectangular blocks 107 and 108 joined to a spindle 109 for receiving the platen assemblies, and the drive shafts 48 and 101 of the upper or the lower head as the case may be. As is best shown in FIG. 11, the shafts 48 and 101 joined to the blocks 107 and 108 are off-set in a horizontal plane to provide a crank to secure the aforementioned curvilinear translation motion. Provision is made for varying the amount of off-set or eccentricity by providing a bedded slide 110 and machine screws 111 extending through elongated clearance slots 112 in the block 108 for engagement with tapped holes 113 in the block 107. A divided clamp 114 projects from the exposed surface of the block 108 and is provided with three set screws 115 spaced at equal intervals for attaching the platen assembly concentric with the spindle 109. Graduated weights 116 are secured by nuts 117 on threaded rods 118 on the block 108 to counterbalance the centrifugal force of the platen and are varied with off-set of the eccentric.

Change in off-set or eccentricity is accomplished by changing the amount or the number of spacers 119. These spacers are of various thicknesses and proper selection and installation will establish the relative off-set of spindle 109 with respect to rotating drive shaft 48 or 101. The screws 120 are to support the spacers 119 while adjustment of the off-set is being made.

Referring now more particularly to FIGS. 6 to 15, there is illustrated the novel platen assembly in accordance with the invention. The upper and lower platen assemblies have been generally indicated by the numerals 40 and 40a respectively, to distinguish therebetween; however, for all practical purposes, they may be considered identical in construction and accordingly only the upper platen has been shown in detail. The only differences in construction are minor engineering changes required to resist the direction of thrust occasioned by the conversion of the platen assembly when mounted in one position as related to the platen mounted in the other position.

The platens 40 and 40a comprise a rectangular base plate 125 to which is welded or otherwise rigidly secured an upstanding bridge assembly or ribbed superstructure indicated generally at 126. The bridge assembly 126 includes a pair of spaced, parallel walls 127 and 128 extending longitudinally of the platen adjacent the sides thereof, walls 129 and 130 also extending parallel and longitudinally of the platen inside of the walls 127 and 128, and a plurality of bracing walls 131 extending in spaced, parallel relationship transversely of the platen. Located at opposite ends of the platen and on the longitudinal centerline thereof are a pair of bearing wells or cages indicated generally at 132 and 133. The bearing wells 132 and 133 are defined by continuous walls forming frame members 134 and 135 respectively, which are generally rectangular in cross section. The frame members 134 and 135 are secured or supported in their upstanding position by the walls 129, 130 and 131 and are welded to the base plate 125. The wells 132 and 133 are located as close as possible in vertical alignment with the drive spindles 109 of the eccentric mechanisms. Cover plates 136 and 137 are provided over the platen assembly and secured to the walls 127, 128, 129 and 130 in any suitable manner.

Figure 10:
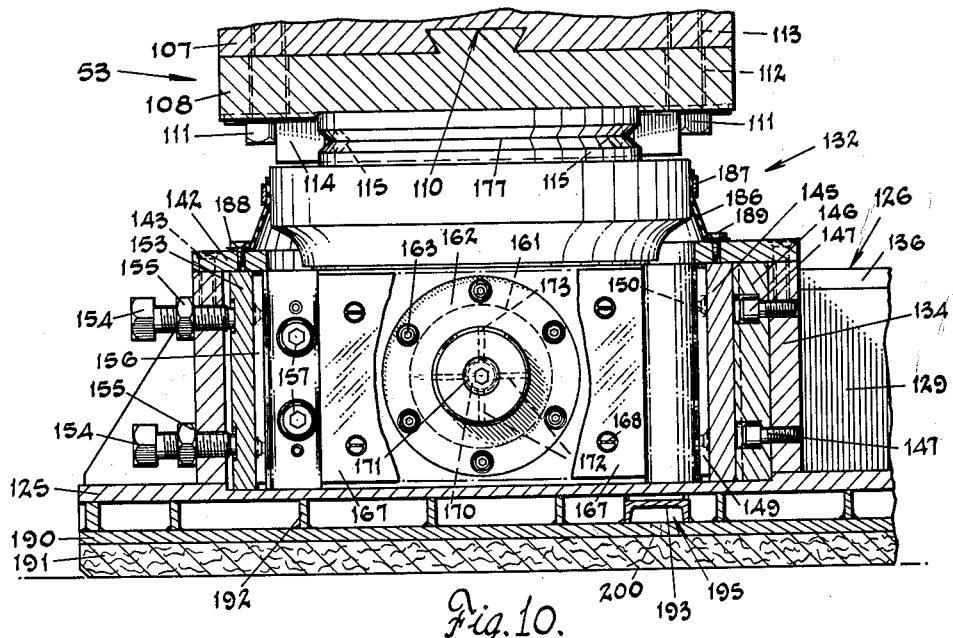
FIG. 10 is a vertical sectional view taken on line 10—10 of FIG. 9.

Referring now particularly to the bearing well 132, as seen in FIGS. 8, 9 and 10, a clamp plate 138 is provided at one side of the interior thereof and is provided with suitable recesses for receiving the ends of six adjusting screws 139 aligned vertically in two rows of three screws spaced longitudinally of the platen. The screws 139 are in threaded engagement with the frame member 134 and extend outwardly therefrom through the wall 127. A sleeve 140 is fixed to the outer surface of the frame member 134 and extends through the wall 127 surrounding and in concentric relationship with each screw 139. Lock nuts 141 are provided and threaded on each screw 139, such lock nuts being adapted to be tightened into engagement with the ends of sleeves 140 to hold the screws 139 in a selected position during the surfacing operation. In this manner then, the clamp plate 138 may be moved inwardly or outwardly with respect to the frame member 134 in the slideway formed by the base plate 125 and a ring cover member 142, which is secured to the top of the frame member 134 by screws 143, by turning the screws 139. The sleeves 140 form a rigid support between the wall 127 and the frame member 134 in order to prevent any possible collapsing or bending of the wall during the inward tightening of the screws in a manner to be hereinafter described.

An additional pair of screws 144 of longer length than the screws 139 are provided and also extend between the wall 127 and the frame member 134, being in threaded engagement with the frame member. The screws 144 are joined at their inner ends to a sliding bearing taper lock plate 145. The sliding lock plate 145 is positioned in wedged relationship between a fixed bearing taper lock plate 146, which is secured by means of screws 147 to the frame member 134, and a trunnion block 148, and adapted to slide therebetween in the way defined by the member 142 and the base plate 125. In this connection, a pressure pad 149 composed of a resilient, vibration dampening material such as "Fabreeka" (registered trademark) is affixed to the trunnion block 148 by means of screws 150 (FIG. 10) to be interposed between the sliding tapered plate 145 and the block 148. Sleeves 151 and lock nuts 152 are also provided, the sleeves 151 surrounding each screw 144 in the same manner as the sleeves 140 with respect to the screws 139, with the lock nuts 152 being in threaded engagement with the screws 144 outwardly of the plate 134.

Located on the opposite interior side of the bearing well 132 from the taper lock plates 145 and 146 is a clamp plate 153. The clamp plate 153 is substantially identical with the clamp plate 138 and is fixed to six screws 154 arranged in two rows of three each which extend through the frame member 134 in threaded engagement therewith. Lock nuts 155 are also provided and surround each screw 154 adjacent the threaded bores in the frame member 134 to lock and maintain such screws and the clamp plate 153 in the desired position in relation to the frame member 134. The clamp plate 153 is disposed adjacent the trunnion block 148 with a pressure pad 156, again formed of a suitable vibration dampening material such as "Fabreeka," being secured to the trunnion block so as to be interposed between the adjacent surfaces of the block and plate.

It will thus be seen that the trunnion block 148 which is composed of two identical L-shaped members joined together by the screws 157 may be moved or adjusted horizontally within the well 132, both longitudinally and transversely of the platen, through selectively tightening and loosening the screws 139, 144 and 154. This positioning of the trunnion block relative to the well 132 and the platen in turn locates a bearing housing 160 for receiving the eccentric drive spindles 109.

As was previously mentioned, the novel platen assembly in accordance with the present invention includes a mounting which enables the platen to rock in a vertical plane normal to the direction of movement of the glass ribbon being surfaced or polished. In this connection, and as best shown in FIG. 11, the bearing housing 160 includes a pair of trunnions 161 integral with the housing and projecting outwardly therefrom along an axis extending transversely of the platen. The trunnions 161 are received and journaled in bushings 162 which in turn are fixed to the trunnion block 148 by means of screws 163. Shims 164 are set in and held in place between the trunnion block 148 and the bushings 162 to assure a proper flush fit between the outer surfaces thereof. The oppositely disposed walls 165 of the trunnion block 148 are relatively heavy and extend outwardly a short distance beyond the bushings 162 and the trunnions 161. These thickened or heavier wall portions are provided with pressure paids 166 and 167 to space the pads from both the bushing and the trunnion to allow journaling of the base plate 125 and bridge assembly 126 relative to the trunnion. In this connection, the pressure pads 166 and 167 are secured to the walls 165 by means of screws 168 and are contacted by the clamp plate 138 and the oppositely disposed wall of frame member 134 respectively.

The trunnions 161 are provided with grease reservoirs 170 which are capped with suitable plugs 171 seated flush with the outer surface of the trunnions. The reservoirs communicate with taps 172 extending radially therefrom which in turn open into a groove 173 about the circumference of the trunnions to provide lubrication between the bushings and the trunnions. An additional tap 174 extends through the bearing housing 160 in alignment with the reservoir 170 and communicates at its inner end with a larger reservoir 175 between the housing and a bearing sleeve 176. The bearing sleeve 176 surrounds the eccentric drive spindle 109 and is fixed to the divided clamp 114 of the block 108 by the set screws 115, the sleeve being provided with a groove 177 in this respect for receiving the inner ends of the screws. The bearing sleeve 176 is supported for rotation relative to the bearing housing and platen assembly by suitable roller bearings 178 and 179 located at either side of the reservoir 175, the inner race of the lower bearing being held in place by a bearing sleeve lock cap 180 fixed to the sleeve by a plurality of lock screws 181. A shim 182 is provided to obtain the desired running clearance between the inner race of the lower bearing and the cap 180 and a bearing housing cap 183 is secured to the housing 160 by screws 184 in spaced relation to the cap 180.

The mounted relation of the bearing housing 160 in the trunnion block 148 and of said block in the frame member 134 is to some extent enclosed by the ring cover member 142 secured to the top of the frame member. However, to protect the several bearings and like moving parts within the bearing cage 132 or 133, from the entry of dirt or other abrasive material, a suitable gland 185 is provided between the upper ends of the housing 160 and sleeve 176 and a flexible, annular guard or "boot" 186 is secured about the upper peripheral surface of the bearing housing 160 by a clamping band 187 while the bottom of the guard is fixed to the upper surface of the cover member 142 by a ring 188 secured thereon by screws 189.

The bearing well 133 is not shown in detail in the drawings since it is similar in construction to the well 132. The only difference in construction between the two wells is that no fixed and sliding tapered lock plates, such as shown at 145 and 146, are employed in the well 133; the trunnion block being in direct contact with the frame member 135 through the pressure pad 149 secured to the latter. In addition, the clamp plates 138 and 153 are positioned at diametrically opposed sides of the well 133 as compared to their location with respect to the well 132.

Figure 12:
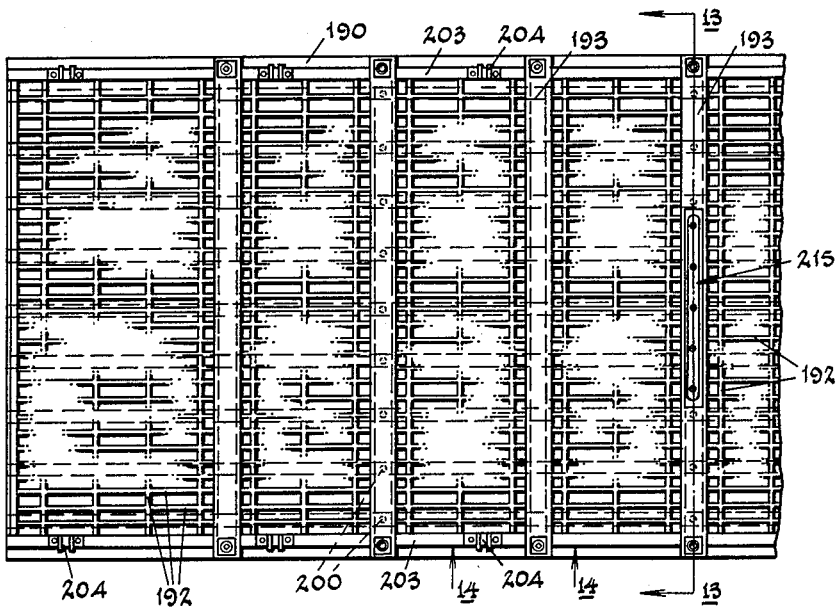
FIG. 12 is a fragmentary plan view of the felt supporting plate of each polishing platen.
Figure 13:
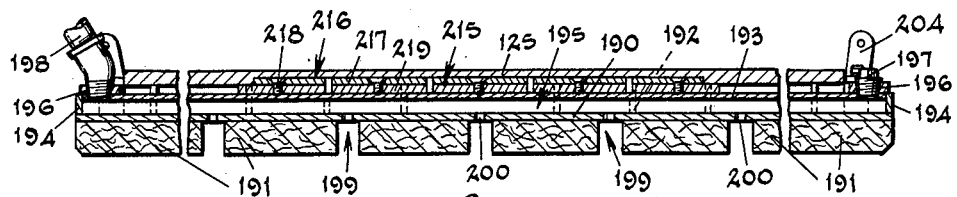
FIG. 13 is a vertical, broken, sectional view taken on line 13—13 of FIG. 12.
Figure 14:
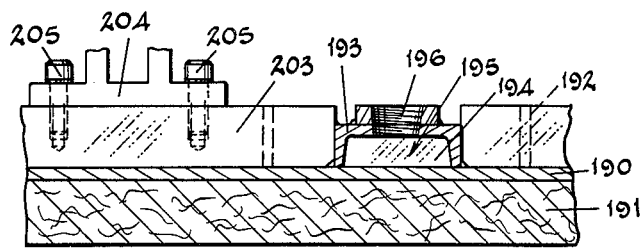
FIG. 14 is a fragmentary sectional view taken on line 14—14 of FIG. 12.

The working face proper of each platen 40 or 40a includes a hollow pan-like member 190 having a pad of felt or other similar resilient material 191 secured to the outer bottom surface thereof in any suitable manner, as will be seen in FIGS. 12, 13 and 14. The pan is provided with a ribbed superstructure comprising the walls 192 which extend in grid formation both longitudinally and transversely of the pan and are welded to the upper surface thereof to provide the necessary rigidity. A series of inverted channels 193 also extend transversely of the pan and platen in longitudinally spaced relation. The channels are fixed to the upper surface of the pan and the longitudinally extending walls 192 and are closed at their ends by plates 194 to provide passageways 195 between the channels and the pan bottom. At either end of the channels 193, threaded bores 196 are provided which communicate with the passageways 195. For a purpose which will hereinafter be explained, certain of the bores 196 are provided with solid plugs 197 while others are connected to conduits 198 (FIG. 1) communicating with a polishing slurry source (not shown).

The felt pad 191 contains a plurality of grooves 199 extending longitudinally of the pan and platen with the bottom of the pan having openings 200 drilled therein into the passageways 195. The openings 200 are located in the pan bottom to communicate with the grooves 199 in the felt whereby polishing slurry delivered through the conduits 198 and into the passageways 195 is fed into the grooves 199 and then into contact with the glass surface during the polishing operation.

The pan 190 is secured to the base plate 125 of the platen by means of eccentric-acting toggle clamps 202 provided at spaced points along the longitudinal edges of the base plate, as shown in FIG. 15. In this connection, upstanding bars 203 of a height equal to that of the walls 192 are fixed to the pan 190 between the channels 193 and adjacent the longitudinal sides of the pan. Bifurcated members or brackets 204 are secured to the bars 203 by screws 205, the bifurcated members including a pin 206 extending between the arms thereof which cooperate with C-hooks 207 of the clamps to secure the pan to the base plate.

The clamps 202 are mounted by channel brackets 208 which are welded or otherwise suitably joined to the base plate 125 at points along the longitudinal edges thereof. The clamps 202 include a bifurcated lever 209 having a cylinder 210 fixed to the arms thereof. The cylinder 210 is provided with a bore located eccentric to the axis thereof through which a pin 211 passes; the pin 211 also extending outwardly of the lever arms and being journaled in the arms of a bifurcated bracket 212 secured to channel bracket 208 by screws 213. A link 214 is journaled on the cylinder 210, the C-hook 207 being fixed to and depending from the bottom of the link.

In this manner then, counter-clockwise rotation of the lever 209 acts to lower the C-hook 207 out of engagement with the pin 206 whereby the pan 190 may be disengaged from the base plate 125 while clockwise rotation of the lever into the position illustrated in FIG. 15 raises the C-hook 207 into engagement with the pin 206 and secures the pan in its working position.

Means are also provided for properly locating the pan 190 relative to the base plate 125 of the platen prior to securing them together in the manner above described. These locating means (FIGS. 12 and 13) include a key bar 215 formed on top of one of the channels 193 which, in the particular embodiment illustrated, is the center or middle channel, and a keyway or groove 216 provided centrally in the bottom surface of the base plate 125. The key bar is formed by a plate 217 fixed by means of screws 218 to a second plate 219 which in turn is secured to the channel 193. Thus, the plate 217, when the pan 190 is in proper position for securing same to the base plate, registers with and is received in the groove 216.

Preparatory to mounting or connecting the platens 40 and 40a to their respective eccentric mechanisms 53, the distance between the vertical axes of the bearing sleeves 176 in housings 160 of bearing cages 132 and 133 is predeterminedly established by means of a template or gage bar (not shown) which is provided with plugs similar in diameter to the spindles 109. The plugs on the gage bar are precisely spaced axially apart according to an established distance between the axes of the actual spindles 109 of the eccentric mechanisms. This insures that when the distance between shaft 48 and spindle 109 of the respective eccentric mechanisms has been fixed by adjustment of the block 108 relative to the block 107, connected to shaft 48, the like distance between the bearing sleeves 176 at the respective ends of a platen will be in accord. To obtain the properly spaced distance between the bearing sleeves 176, the trunnion block 148 of the bearing cage 133 is initially secured therein in the aforementioned manner in which the screws 139 and 154 are tightened against the clamping plates 138 and 153 respectively. The bearing sleeve 176 at this particular end of the platen is, accordingly, fixed and to establish the distance between the axis of this sleeve and the axis of the opposite sleeve of bearing cage 132, the screws 139, 144 and 154, associated with the bearing cage 132, are turned so as to move the associated clamp plates 138 and 153 and sliding lock plate 145 outwardly thereby enabling such insertion of the plugs of the gage bar regardless of minor deviations or errors in construction and machining tolerances, e.g. center distances between the bearing sleeves. The bearing trunnion block 148 of cage 132 can thus be moved until the sleeve 176 therein is accurately located in spaced relation to the sleeve 176 associated with bearing cage 133 at the opposite end of the platen. When said trunnion block has been so located, the screws 139, 144 and 153 are turned inwardly through the walls of frame member 134 to secure the block in position between the clamp plates 138 and 153 and the lock plate 145.

Use of a template or gage bar permits the axes of the bearing sleeves 176 of a platen to be accurately positioned with reference to the working distance between the drive spindles 109 of any head assembly of a surfacing or polishing apparatus preparatory to the installation of the platen thereon. This enables several platens to be made interchangeable to the end that substitutions of one platen for another can be conveniently and rapidly effected. When such installation is to be made the sleeves are aligned with the spindles of the head assembly and the spindles fitted into the sleeves until the grooves 177 register with the set screws 115. Thus, engagement of screws 115, turned through divided clamps 114, with the grooves 177 in the respective bearing sleeves will secure the platens to the eccentric mechanisms 53, i.e. the blocks 107 and 108.

Prior to the mounting of the platens 40 and 40a, a desired polishing slurry distribution is determined and a number of openings 200 are drilled and located in the bottom of the pan 190 to communicate with the passageways 195 of inverted channels 193 which, together with the connection of certain selected bores 196 to the slurry source through conduit 198, provide such a desired distribution. The pan may then be connected to the platens either before or after such platens are joined to the eccentric mechanism as above described. It will be appreciated that due to the novel construction of the working face of the platen, i.e. the hollow pan member, distribution grooves 199 in the felt pad 191 directly under the driving spindles and bearing wells may be readily supplied with sufficient slurry to enable an even and uniform polishing across the entire width of the glass ribbon. In addition, the construction of the pan is extremely lightweight while simultaneously being rigid enough to maintain its shape during the surface operation.

It will be apparent that the novel construction of the platen also enables it to fulfill all of the objects previously set forth and found to be highly desirable in such a structure. In this respect, the employment of the resilient pressure pads as disclosed enables the proper alignment between the driving spindles and the bearing wells or cages to be maintained regardless of the unequal expansion of the driving spindles and platens caused by friction during the surfacing operation due to their permitting a predetermined amount of "play" therebetween. Further, the unique construction of the bearing wells enables, first, a shifting or adjustment of the center distance between the bearing housings on each platen whereby compensation may be obtained for any error or variation in the actual distance between the centers of the driving spindles and, secondly, due to the trunnion mountings, enables the platens to rock in a vertical plane normal to the direction of movement of the glass ribbon about the axis of the trunnions thereby compensating for any uneven wear of the polishing pad while simultaneously obviating any tendency of the platens to rock or rotate slightly about their longitudinal axis, i.e. in the direction of movement of the glass ribbon.

It should further be noted that, although the invention has been described and illustrated in connection with a twin-grinding and/or polishing process, the novel platens or runners as disclosed herein may also be employed to advantage in a single surface polishing line wherein the glass sheet or ribbon is supported by a bed plate or carriage, i.e. where only an upper platen, for example, is utilized, such sheet then being turned over and passed again through the same or different line to effect polishing of its undersurface.

It is to be understood that the forms of the invention herewith shown and described are to be taken as illustrative embodiments only of the same, and that various changes in the shape, size and arrangement of parts may be resorted to without departing from the spirit of the invention.

We claim:

1. In an apparatus for surfacing a continuous glass ribbon moving along a substantially horizontal path, a generally rectangular surfacing platen extending transversely across said path, means for applying a translatory motion to said platen including a pair of spaced driving spindles, a bearing assembly carried by said platen at opposite ends thereof for receiving said driving spindles, and a bearing housing for each said assembly, each said bearing housing including a pair of trunnions projecting outwardly therefrom on either side of the assembly transversely of the platen, said platen being journaled on said trunnions to rock in a vertical plane normal to the direction of movement of the ribbon about an axis parallel to said direction of movement.

2. In an apparatus for surfacing a continuous glass ribbon moving along a substantially horizontal path, a generally rectangular surfacing platen extending transversely across said path, means for applying a translatory motion to said platen including a pair of spaced driving spindles, a bearing assembly carried by said platen at opposite ends thereof for receiving said driving spindles, a bearing housing for each said assembly, a frame surrounding each said bearing housing and rigidly secured to said platen, and a plurality of adjustable clamping members acting between said frame and said bearing housing for locating said housing relative to said frame.

3. In an apparatus for surfacing a continuous glass ribbon moving along a substantially horizontal path, a generally rectangular surfacing platen extending transversely across said path, means for applying a translatory motion to said platen including a pair of spaced driving spindles, a bearing assembly carried by said platen at opposite ends thereof for receiving said driving spindles, a bearing housing for each said assembly, each said bearing housing including a pair of trunnions projecting outwardly therefrom on either side of the assembly transversely of the platen, said platen being journaled on said trunnions to rock in a vertical plane normal to the direction of movement of the ribbon about an axis parallel to said direction of movement, a frame surrounding each said bearing housing and rigidly secured to said platen, and a plurality of adjustable clamping members acting between said frame and said bearing housing for locating said housing relative to said frame.

4. In an apparatus for surfacing a continuous glass ribbon moving along a substantially horizontal path, a generally rectangular surfacing platen extending transversely across said path, means for applying a translatory motion to said platen including a pair of spaced driving spindles, a bearing assembly carried by said platen at opposite ends thereof for receiving said driving spindles, a bearing housing for each said assembly, a frame surrounding each said bearing housing and rigidly secured to said platen, a plurality of adjustable clamping members acting between said frame and said bearing housing for locating said housing relative to said frame, and a plurality of resilient, vibration dampening pads positioned intermediate said clamping members and said bearing housing and through which said clamping members act in locating said housing.

5. In an apparatus for surfacing a continuous glass ribbon moving along a substantially horizontal path, a generally rectangular surfacing platen extending transversely of said path, means for applying a translatory motion to said platen including a pair of spaced driving spindles, a bearing assembly carried by said platen at opposite ends thereof for receiving said driving spindles, a bearing housing for each said assembly, each said bearing housing including a pair of trunnions projecting outwardly therefrom on either side of the assembly along an axis extending transversely of the platen, said trunnions being received and journaled in a trunnion block surrounding each said bearing housing, a frame surrounding each said trunnion block and rigidly secured to said platen, and a plurality of adjustable clamping members acting between said frame and said trunnion block for locating said trunnion block and said housing relative to said frame.

6. Apparatus in accordance with claim 5, in which a bearing sleeve is journaled in each said bearing assembly, said bearing sleeve being fixed to and surrounding said driving spindle.

7. Apparatus in accordance with claim 5, in which resilient, vibration dampening pads are positioned intermediate said clamping members and said trunnion block.

8. In an apparatus for simultaneously surfacing both sides of a continuous glass ribbon moving along a substantially horizontal path, a pair of opposed, generally rectangular surfacing platens extending transversely across said path and between which said ribbon moves, upper mounting means for mounting one of said platens in engagement with the top surface of the ribbon, lower mounting means to mount the other platen in engagement with the bottom surface of the ribbon, each of said mounting means including eccentric drive means for applying a translatory motion to said platens, each said drive means including a pair of spaced driving spindles, a pair of bearing assemblies carried by each of said platens at opposite ends thereof for receiving said driving spindles, and a bearing housing for each said assembly, each said bearing housing including a pair of trunnions projecting outwardly therefrom on either side of the assembly transversely of the platen, said platens being journaled on said trunnions to rock in a vertical plane normal to the direction of movement of the ribbon about an axis parallel to said direction of movement.

9. In an apparatus for simultaneously surfacing both sides of a continuous glass ribbon moving along a substantially horizontal path, a pair of opposed, generally rectangular surfacing platens extending transversely across said path and between which said ribbon moves, upper mounting means for mounting one of said platens in engagement with the top surface of the ribbon, lower mounting means to mount the other platen in engagement with the bottom surface of the ribbon, each of said mounting means including eccentric drive means for applying a translatory motion to said platens, each of said drive means including a pair of spaced driving spindles, a pair of bearing assemblies carried by each of said platens at opposite ends thereof for receiving said driving spindles, a bearing housing for each said assembly, a frame surrounding each said bearing housing and rigidly secured to the platen, and a plurality of adjustable clamping members acting between said frame and said bearing housing for locating said housing relative to said frame.

10. In an apparatus for simultaneously surfacing both sides of a continuous glass ribbon moving along a substantially horizontal path, a pair of opposed, generally rectangular surfacing platens extending transversely across said path and between which said ribbon moves, upper mounting means for mounting one of said platens in engagement with the top surface of the ribbon, lower mounting means to mount the other platen in engagement with the bottom surface of the ribbon, each of said mounting means including eccentric drive means for applying a translatory motion to said platens, each of said drive means including a pair of spaced driving spindles, a pair of bearing assemblies carried by each of said platens at opposite ends thereof for receiving said driving spindles, a bearing housing for each said assembly, each said bearing housing including a pair of trunnions projecting outwardly therefrom on either side of the assembly along an axis extending transversely of the platen, said trunnions being received and journaled in a trunnion block surrounding each said bearing housing, a frame surrounding each said trunnion block and rigidly secured to the platen, a plurality of adjustable clamping members acting between said frame and said trunnion block for locating said trunnion block and said housing relative to said frame, and a plurality of resilient, vibration dampening pads positioned intermediate said clamping members and said trunnion block.

11. In an apparatus for surfacing a continuous glass ribbon moving along a substantially horizontal path, a generally rectangular surfacing platen having a working face including a hollow pan-like member, a series of spaced, inverted channels extending transversely of the pan and affixed to the inner bottom surface thereof to provide passageways therealong, a pad of resilient material secured to the outer bottom surface of said pan and having grooves therein extending longitudinally of the pan, a series of apertures provided in the pan bottom and communicating with both said grooves and said passageways, and means for feeding a fluid polishing medium interiorly of said channels.

12. Apparatus in accordance with claim 11, in which said feeding means includes bores provided at either end of said channels, at least one of which bores communicates with a polishing slurry source.

13. Apparatus in accordance with claim 11, in which a ribbed superstructure comprising a plurality of upstanding walls of substantially the same height as the depth of the pan member and extending both longitudinally and transversely of the pan is provided, said walls being affixed to the inner bottom surface of the pan.

14. In an apparatus for surfacing a continuous glass ribbon moving along a substantially horizontal path, a generally rectangular surfacing platen extending transversely of said path and including a base plate, means for applying a translatory motion to said platen including a pair of spaced driving spindles, a bearing assembly carried by said platen at opposite ends thereof for receiving said driving spindles, an upstanding frame surrounding each said bearing assembly and rigidly secured to the upper surface of said base plate, a pan secured to the undersurface of said base plate and forming therewith a hollow, enclosed chamber, a series of spaced, inverted channels extending transversely of the pan and affixed to the inner bottom surface thereof to provide passageways therealong, a pad of resilient material secured to the outer bottom surface of said pan and having grooves therein extending longitudinally of the pan, a series of apertures provided in the pan bottom and communicating with both said grooves and said passageways, and means for feeding a fluid polishing medium interiorly of said channels.

15. Apparatus in accordance with claim 14, in which a key is provided on one of said channels and extends upwardly therefrom, and a keyway is provided in the bottom surface of said base plate for registry with said key when said pan is properly positioned with relation to said base plate.

16. Apparatus in accordance with claim 14, in which a bearing housing is provided for each said bearing assembly and located interiorly of said frame, each said bearing housing including a pair of trunnions projecting outwardly therefrom on either side of the assembly transversely of the platen, said platen being journaled on said trunnions to rock in a vertical plane normal to the direction of movement of the ribbon about an axis parallel to said direction of movement.

17. Apparatus in accordance with claim 16, in which said trunnions are received and journaled in a trunnion block located interiorly of said frame and surrounding each said bearing housing.

18. Apparatus in accordance with claim 17, in which a plurality of adjustable clamping members are provided and act between said frame and said trunnion block for locating said trunnion block and said bearing housing relative to said frame.

19. Apparatus in accordance with claim 18, in which resilient, vibration dampening pads are positioned intermediate said clamping members and said trunnion block.

References Cited in the file of this patent

UNITED STATES PATENTS

| | | |
|---|---|---|
| 2,935,823 | Heymes | May 10, 1960 |
| 3,036,410 | Boyet et al. | May 29, 1962 |